(12) United States Patent
Kaleem et al.

(10) Patent No.: US 10,442,572 B2
(45) Date of Patent: Oct. 15, 2019

(54) COATED FOOD-CONTACTING CONTAINERS

(71) Applicant: PPG Industries Ohio, Inc., Cleveland, OH (US)

(72) Inventors: Kareem Kaleem, Loveland, OH (US); Youssef Moussa, Loveland, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 564 days.

(21) Appl. No.: 14/518,198

(22) Filed: Oct. 20, 2014

(65) Prior Publication Data

US 2016/0108276 A1 Apr. 21, 2016

(51) Int. Cl.
| | | |
|---|---|---|
| *C09D 151/00* | (2006.01) | |
| *B65D 25/14* | (2006.01) | |
| *C08G 63/19* | (2006.01) | |
| *C08F 283/02* | (2006.01) | |
| *C08G 63/20* | (2006.01) | |
| *C09D 151/08* | (2006.01) | |

(52) U.S. Cl.
CPC ............ *B65D 25/14* (2013.01); *C08F 283/02* (2013.01); *C08G 63/19* (2013.01); *C08G 63/20* (2013.01); *C09D 151/08* (2013.01)

(58) Field of Classification Search
CPC ......... B65D 25/14; C09D 151/08; A23L 5/00; C08G 63/20; C08G 63/19; C08F 283/02
USPC ... 428/412, 423.1, 221, 425.1, 425.5, 425.6, 428/425.8, 220, 483, 174, 413, 1.33, 35.7, 428/475.2, 480, 521, 113, 114, 141, 1.31, 428/200, 213, 215, 216, 318.6, 319.3, 428/319.7, 319.9, 320.2, 335, 36.92, 398, 428/400, 418, 421, 423.7, 430, 447, 428/473.5, 474.7, 515, 522, 532; 427/74, 427/209, 2.11, 2.14, 487, 510
See application file for complete search history.

(56) References Cited

U.S. PATENT DOCUMENTS

| | | |
|---|---|---|
| 3,271,363 A | 9/1966 | Nikles |
| 3,395,128 A | 7/1968 | Hale et al. |
| 4,544,731 A | 10/1985 | Cavitt et al. |
| 7,910,170 B2 | 3/2011 | Evans et al. |
| 2003/0151025 A1 | 8/2003 | Yang et al. |
| 2005/0196629 A1* | 9/2005 | Bariatinsky ............ B65D 25/14 428/480 |
| 2007/0036903 A1 | 2/2007 | Mayr et al. |
| 2007/0036923 A1 | 2/2007 | Ishizaki et al. |
| 2007/0054140 A1* | 3/2007 | Mayr ................. C08G 18/4027 428/480 |
| 2010/0243506 A1* | 9/2010 | Cleaver .................. B65D 25/14 206/524.6 |
| 2012/0172568 A1 | 7/2012 | Ueda |
| 2012/0301645 A1 | 11/2012 | Moussa et al. |
| 2013/0143982 A1 | 6/2013 | Jin et al. |
| 2013/0178591 A1 | 7/2013 | Jin et al. |
| 2013/0206756 A1 | 8/2013 | Niederst et al. |
| 2013/0224413 A1* | 8/2013 | Prouvost .................. C08J 7/047 428/35.8 |
| 2013/0280455 A1 | 10/2013 | Evans et al. |
| 2013/0316109 A1 | 11/2013 | Niederst et al. |
| 2014/0088289 A1 | 3/2014 | Schmidt |
| 2014/0370219 A1 | 12/2014 | Ogawa et al. |
| 2015/0353796 A1* | 12/2015 | Nakamura ............. C08G 81/00 252/519.21 |

FOREIGN PATENT DOCUMENTS

| | | | |
|---|---|---|---|
| GB | 901208 | 7/1962 | |
| GB | 2001324 A | 1/1979 | |
| JP | WO 2014115745 A1 * | 7/2014 | ............ C08G 81/00 |
| WO | WO 95/10556 | 4/1995 | |

* cited by examiner

*Primary Examiner* — Gerard Higgins
*Assistant Examiner* — Kevin C Ortman, Jr.
(74) *Attorney, Agent, or Firm* — William J. Uhl; Julie W. Meder

(57) ABSTRACT

Containers comprising a food-contacting surface and a coating thereon are disclosed. The coating comprises a polymer derived from benzene dimethanol having segments of the following structure:

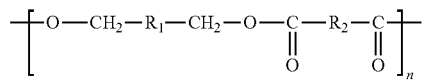

where $R_1$ is phenylene and $R_2$ is a divalent organic group and n=5 to 50.

5 Claims, No Drawings

COATED FOOD-CONTACTING CONTAINERS

FIELD OF THE INVENTION

The present invention relates to coated containers such as coated metal cans that are in contact with foods and beverages.

BACKGROUND OF THE INVENTION

A wide variety of coatings have been used to coat the surfaces of food and beverage containers. For example, metal cans are sometimes coated using coil coating or sheet coating operations, that is, a coil or sheet of steel or aluminum, is coated with a suitable composition and cured. The coated substrate is then formed into the can body or can end. Alternatively, the coating composition may be applied, for example, by spraying and dipping, to the formed can and then cured. Coatings for food and beverage containers should preferably be capable of high speed application to the substrate and provide the necessary properties when cured to perform in a demanding end use environment. For example, the coating should be safe for food contact and have excellent adhesion to the substrate.

Many of the coating compositions for food and beverage containers are based on polyether resins that are based on polyglycidyl ethers of bisphenol A. Bisphenol A in container coatings either as bisphenol A itself (BPA) or derivatives thereof, such as diglycidyl ethers of bisphenol A (BADGE), epoxy novolak resins and polyols prepared with bisphenol A and bisphenol F are problematic. Although the balance of scientific evidence available to date indicates that small trace amounts of BPA or BADGE that might be released from existing coatings does not pose health risks to humans, these compounds are nevertheless perceived by some as being harmful to human health. Consequently, there is a strong desire to eliminate these compounds from coatings for food and beverage containers. Accordingly, what are desired are container coating compositions for food and beverage containers that do not contain extractable quantities of BPA, BADGE or other derivatives of BPA and yet have commercially acceptable properties.

SUMMARY OF THE INVENTION

The present invention provides a container comprising a food-contacting surface wherein at least a portion of the food-contacting surface is coated with a composition comprising a polymer derived from benzene dimethanol having segments of the following structure:

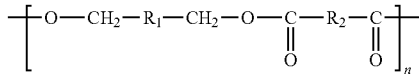

where $R_1$ is phenylene and $R_2$ is a divalent organic group and n=5 to 50.

DETAILED DESCRIPTION

As used herein, unless otherwise expressly specified, all numbers such as those expressing values, ranges, amounts or percentages may be read as if prefaced by the word "about", even if the term does not expressly appear. Moreover, it should be noted that plural terms and/or phrases encompass their singular equivalents and vice versa. For example, "a" polymer, "a" crosslinker, and any other component refers to one or more of these components.

When referring to any numerical range of values, such ranges are understood to include each and every number and/or fraction between the stated range minimum and maximum.

As employed herein, the term "polyol" or variations thereof refers broadly to a material having an average of two or more hydroxyl groups per molecule. The term "polycarboxylic acid" refers to the adds and functional derivatives thereof, including anhydride derivatives where they exist, and lower alkyl esters having 1-4 carbon atoms.

As used herein, the term "polymer" refers broadly to prepolymers, oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, ethacrylic add, etc., and their $C_1$-$C_5$ alkyl esters, unless clearly indicated otherwise. The terms "(meth) acrylic" or "(meth)acrylate" are intended to cover both the acrylic/acrylate and methacrylic/methacrylate forms of the indicated material, e.g., a (meth)acrylate monomer. The term "(meth)acrylic polymer" refers to polymers prepared from one or more (meth)acrylic monomers.

(Cyclo)aliphatic refers to both cyclic aliphatic compounds and to straight chain aliphatic compounds particularly where aliphatic is alkylene.

As used herein, "a" and "the at least one" and "one or more" are used interchangeably. Thus, for example, a coating composition that comprises "a" polymer can be interpreted to mean the coating composition includes "one or more" polymers.

As used herein, the molecular weights are determined by gel permeation chromatography using a polystyrene standard. Unless otherwise indicated, molecular weights are on a number average basis (Mn).

By "food" in "food-contacting surface" is meant to include solid foodstuffs as well as beverages.

The compositions of the invention comprise a polyester polymer derived from benzene dimethanol having segments of the following structure:

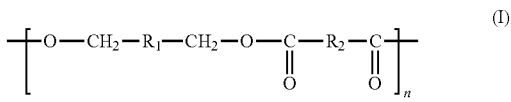

where $R_1$ is phenylene and $R_2$ is a divalent organic group and n=5 to 50.

The polyester can be prepared from reacting benzene dimethanol with a polycarboxylic add, particularly a dicarboxylic acid. $R_2$ can also be an arylene group such as that derived from phthalic acid, isophthalic acid, terephthalic acid and naphthalene dicarboxylic acid. $R_2$ can also be a saturated (cyclo)aliphatic group such as (cyclo)alkylene containing from 4 to 12 carbon atoms such as adipic acid, sebacic acid and cyclohexane dicarboxylic acid. $R_2$ can be derived from a mixture of the dicarboxylic acids mentioned above.

In addition to benzene dimethanol, other polyols can be used with benzene dimethanol in making the polyesters. Examples include (cyclo)aliphatic diols such as those containing from 2 to 12 carbon atoms such as ethylene glycol, 1,4-butanediol, 2-butyl-2-ethyl-1,3-propanediol and cyclohexane dimethanol. Also, higher functional polyols may be used in combination with the diols. Examples are triols such as trimethylolpropane.

The moles of dicarboxylic acid and polyol are usually adjusted such that the number average molecular weight is from 2,000 to 25,000. The polyesters are typically hydroxyl-functional having hydroxyl numbers of 5 to 15. The polyesters are prepared by condensation polymerization conditions such as is well known in the art and described by Zeno Wicks, Jr. et al. in Organic Coatings; Science and Technology, Vol. 1, pages 122-132 (John Wiley & Sons; New York, 1992).

The polyesters of the invention are applied to the substrate as a component in a coating composition that includes a liquid carrier. The liquid carrier may be water, organic solvent or mixtures thereof. Accordingly, the liquid coating compositions of the present invention may be aqueous based (containing water and optionally some water-miscible organic solvent) or be organic solvent based, that is, substantially no water (i.e., less than 2% by weight water based on total weight of the coating composition). Examples of suitable organic solvents are glycol ethers, alcohols, aromatic or aliphatic hydrocarbons, ketones, esters and mixtures thereof. The liquid carriers are selected to provide a dispersion or solution of the polyester for further coating formulation.

The polyesters of the present invention can be dissolved or dispersed in the liquid carrier and formulated with a crosslinking agent such as an aminoplast or phenolplast curing agent (as described below) and normal additives known in coatings for food-contacting surfaces of containers. Typically, the coating compositions based on the polyesters of the present invention have resin solids contents of 20 to 50% by weight based on total weight of the coating composition.

Because of the activated methylene group in benzene dimethanol, the polyester can be grafted via proton abstraction to a water-dispersible (meth)acrylic polymer such as by grafting with a (meth)acrylic acid functional monomer that contains double bonds, which is polymerizable by a free radical mechanism. Examples of such monomers are (meth) acrylic acid and ethylenically unsaturated monomers not containing acid groups such as (meth)acrylic acid esters, styrene and the like. The resulting graft copolymer can then be at least partially neutralized with a base such as a tertiary amine. The resin solids content of the aqueous-based coating compositions is typically from 20 to 50% by weight resin solids based on total weight of the coating composition.

The acrylic portion of the polyester-epoxy-acrylic graft copolymer comprises polymerized ethylenically unsaturated monomers which include carboxyl functional monomers such as (meth)acrylic add and unsaturated dicarboxylic adds such as maleic or fumaric, to provide carboxyl functionality for dispersing the graft copolymer into water. The balance of the monomers preferably are non-functional under the contemplated conditions of polymerization, although small amounts of other reactive monomers may be used such as hydroxy monomers illustrated by 2-hydroxy ethyl (meth) acrylate, amide monomers illustrated by (meth)acrylamide, or N-methylol monomers illustrated by N-methylol (meth) acrylamide. The remaining monomers are non-functional but copolymerizable ethylenic monomers illustrated by (meth)acrylate esters containing from 1 to 10 carbon atoms in the ester group, such as ethyl (meth)acrylate, methyl (meth)acrylate, isobutyl (meth)acrylate and 2-ethylhexyl (meth)acrylate; aromatic vinyl monomers such as styrene and vinyl toluene; vinyl monomers such as vinyl acetate, vinyl chloride, vinylidene chloride and other ethylenically unsaturated monomers such as butadiene and acrylonitrile. The (meth)acrylic polymer segment preferably comprises by weight between about 5% and 40% based on the weight of the acrylic grafted polyester.

The polyester acrylic graft copolymer mixture can be prepared by in-situ non-aqueous polymerization of the ethylenic monomers with the polyester resin. The polyester resin can be heated in a reactor wherein the polymerizable monomer can be added slowly over a period of at least two or three hours along with a solvent and a free radical initiator. Although the reaction may be conducted in the absence of a solvent, some solvent is desirable for the polymerization of monomers in the presence of polyester resin. Solvents such as xylene, benzene, ethyl benzene, toluene, and the alkoxy alkanols are satisfactory. Alcohols such as methanol, ethanol, propanol, butanol, ethylene glycol monoethyl ether and butanol being preferred. For subsequent dispersion into water, the solvents selected are usually water-soluble materials, such as butanol, propanol, ethylene glycol monoethyl ether, and the like, although small amounts of water-immiscible solvents such as mineral spirits, hexane, and similar aliphatics may be used.

As mentioned above, the coating compositions of the present invention contain a crosslinking agent Examples of crosslinking agents are phenolplast and aminoplast.

Suitable phenolplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

Suitable aminoplast resins are the condensation products of aldehydes such as formaldehyde, acetaldehyde, crotonaldehyde, and benzaldehyde with amino- or amido-group-containing substances such as urea, melamine, and benzoguanamine. Examples of suitable aminoplast crosslinking resins include, without limitation, benzoguanamine-formaldehyde resins, melamine-formaldehyde resins, etherified melamine-formaldehyde, and urea-formaldehyde resins.

The level of curing agent (e.g., crosslinker) used will typically depend on the type of curing agent, the time and temperature of the bake, the molecular weight of the binder polymer, and the desired coating properties. If used, the crosslinker is typically present in an amount of up to 50 wt-%, preferably up to 30 wt-%, and more preferably up to 15 wt-%. If used, a crosslinker is preferably present in an amount of at least 0.1 wt-%, more preferably at least 1 wt-%, and even more preferably at least 1.5 wt-%. These weight percentages are based upon the total weight of the resin solids in the coating composition.

The coating composition of the present invention may also include other optional polymers that do not adversely affect the coating composition or a cured coating composition resulting therefrom. Such optional polymers are typically included in a coating composition as a filler material, although they can also be included, for example, as a binder polymer, a crosslinking material, or to provide desirable properties. One or more optional polymers (e.g., filler polymers) can be included in a sufficient amount to serve an intended purpose, but not in such an amount to adversely affect a coating composition or a cured coating composition resulting therefrom.

Such additional polymeric materials can be nonreactive, and hence, simply function as fillers. Such optional nonreactive filler polymers include, for example, polyesters and (meth)acrylic polymers. Alternatively, such additional polymeric materials or monomers can be reactive with other components of the composition. If desired, reactive polymers can be incorporated into the compositions of the present invention, to provide additional functionality for various purposes, including crosslinking or dispersing the polymer of the present invention into water. Examples of such reactive polymers include, for example, functionalized polyesters and functionalized (meth)acrylic polymers.

Another optional ingredient is a catalyst to increase the rate of cure. Examples of catalysts include, but are not limited to, strong acids, e.g., phosphoric acid, dodecylbenzene sulphonic acid (DDBSA), available as CYCAT 600 from Cytec, methane sulfonic acid (MSA), p-toluene sulfonic acid (pTSA), dinonylnaphthalene disulfonic acid (DNNDSA). If used, a catalyst is preferably present in an amount of at least 0.01 wt-%, such as at least 0.1 wt-%, based on the weight of nonvolatile material in the coating composition. If used, a catalyst is preferably present in an amount of no greater than 3 wt-%, such as no greater than 1 wt-%, based on the weight of nonvolatile material in the coating composition.

Another useful optional ingredient is a lubricant (e.g., a wax), which facilitates manufacture of fabricated metal articles (e.g., closures and food or beverage can ends) by imparting lubricity to sheets of coated metal substrate. Non-limiting examples of suitable lubricants include, for example, natural waxes such as Carnauba wax or lanolin wax, polytetrafluoroethane (PTFE) and polyethylene-type lubricants. If used, a lubricant is preferably present in the coating composition in an amount of at least 0.1 wt-%, such as no greater than 2 wt-%, and typically no greater than 1 wt-%, based on the total weight of nonvolatile material in the coating composition.

Another useful optional ingredient is a pigment, such as titanium dioxide. If used, a pigment is present in the coating composition in an amount of no greater than 70 wt-%, such as no greater than 50 wt-%, and typically no greater than 40 wt-%, based on the total weight of solids in the coating composition.

Surfactants can be optionally added to the coating composition, e.g., to aid in flow and wetting of the substrate. Examples of surfactants include, but are not limited to, nonylphenol polyethers and salts and similar surfactants known to persons skilled in the art. If used, a surfactant is preferably present in an amount of at least 0.01 wt-%, such as at least 0.1 wt-%, based on the weight of resin solids. If used, a surfactant is usually present in an amount no greater than 10 wt-%, and typically no greater than 5 wt-%, based on the weight of resin solids.

The coating compositions used in the practice of this invention are substantially free, may be essentially free and/or may be completely free of bisphenol A and derivatives or residues thereof, including bisphenol A and bisphenol A diglycidyl ether ("BADGE"). A reaction product and/or coating that is substantially bisphenol A free is sometimes referred to as "BPA non intent" because BPA, including derivatives or residues thereof, are not intentionally added but may be present in trace amounts such as because of impurities or unavoidable contamination from the environment. The reaction product and/or coatings of the present invention can also be substantially free, essentially free and/or completely free of bisphenol F and derivatives or residues thereof, including bisphenol F and bisphenol F diglycidyl ether ("BPFDG"). The term "substantially free" as used in this context means the reaction product and/or coating compositions contain less than 1000 parts per million (ppm), "essentially free" means less than 100 ppm and "completely free" means less than 20 parts per billion (ppb) of any of the above compounds or derivatives or residues thereof.

The coating composition of the present invention can be present as a layer of a mono-layer coating system or one or more layers of a multi-layer coating system. The coating composition can be used as a primer coat, an intermediate coat, a top coat, or a combination thereof. The coating thickness of a particular layer and the overall coating system will vary depending upon the coating material used, the substrate, the coating application method, and the end use for the coated article. Mono-layer or multi-layer coating systems including one or more layers formed from a coating composition of the present invention may have any suitable overall coating thickness, but will typically have an overall average dry coating thickness of from about 1 to about 60 microns and more, typically from about 2 to about 15 microns. Typically, the average total coating thickness for rigid metal food or beverage can applications will be about 3 to about 10 microns. Coating systems for closure applications may have an average total coating thickness up to about 15 microns. In certain embodiments in which the coating composition is used as an interior coating on a drum (e.g., a drum for use with food or beverage products), the total coating thickness may be approximately 25 microns.

The coating composition of the present invention may be applied to a substrate either prior to, or after, the substrate is formed into an article (such as, for example, a food or beverage container or a portion thereof). In one embodiment, a method is provided that includes: applying a coating composition described herein to a metal substrate (e.g., applying the composition to the metal substrate in the form of a planar coil or sheet), curing the composition, and forming (e.g., via stamping) the substrate into a packaging container or a portion thereof (e.g., a food or beverage can or a portion thereof). For example, riveted beverage can ends having a cured coating of the present invention on a surface thereof can be formed in such a process. In another embodiment, the coating composition is applied to a preformed metal food or beverage can, or a portion thereof. For example, in some embodiments, the coating composition is spray applied to an interior surface of a preformed food or beverage can (e.g., as typically occurs with "two-piece" food or beverage cans). After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely un-crosslinked state. The coated substrates can then be heated to fully cure the compositions. In certain instances, coating compositions of the present invention can be dried and cured in one step.

The cure conditions will vary depending upon the method of application and the intended end use. The curing process may be performed at any suitable temperature, including, for example, oven temperatures in the range of from about 100° C. to about 300° C., and more typically from about 177° C. to about 250° C. If metal mil is the substrate to be coated, curing of the applied coating composition may be conducted, for example, by heating the coated metal substrate over a suitable time period to a peak metal temperature ("PMT") of preferably greater than about 350° F. (177° C.). More preferably, the coated metal coil is heated for a suitable time period (e.g., about 5 to 900 seconds, more typically about 5 to 30 seconds) to a PMT of at least about 425° F. (218° C.).

The coating compositions of the present invention are particularly useful for coating metal substrates. The coating compositions may be used to coat packaging articles such as a food or beverage container, or a portion thereof. In preferred embodiments, the container is a food or beverage can and the surface of the container is the surface of a metal substrate. The polymer can be applied to a metal substrate either before or after the substrate is formed into a can (e.g., two-piece cans, three-piece cans) or portions thereof, whether it be a can end or can body. Polymers of the present invention are suitable for use in food-contact situations and may be used on the inside of such cans. They are particularly useful on the interior of two-piece or three-piece can ends or bodies.

The metal substrate used in forming rigid food or beverage cans, or portions thereof, typically has a thickness in the range of about 0.005 inches to about 0.025 inches. Electro tinplated steel, cold-rolled steel, and aluminum are commonly used as metal substrates for food or beverage cans, or portions thereof. In embodiments in which a metal foil substrate is employed in forming, e.g., a packaging article, the thickness of the metal foil substrate may be even thinner than that described above.

The coating compositions of the present invention may be suitable, for example, for spray coating, coil coating, wash coating, sheet coating, and side seam coating (e.g., food can side seam coating). A further discussion of such application methods is provided below. It is contemplated that coating compositions of the present invention may be suitably used in each of these application methods discussed further below, including the end uses associated therewith.

Spray coating includes the introduction of the coating composition into the inside of a preformed packaging container. Typical preformed packaging containers suitable for spray coating include food cans, beer and beverage containers, and the like. The spray process preferably utilizes a spray nozzle capable of uniformly coating the inside of the preformed packaging container. The sprayed preformed container is then subjected to heat to remove any residual carriers (e.g., water or solvents) and harden the coating.

A coil coating is described as the coating of a continuous coil composed of a metal (e.g., steel or aluminum). Once coated, the coating coil is subjected to a short thermal curing cycle, for hardening (e.g., drying and curing) of the coating. Coil coatings provide coated metal (e.g., steel and/or aluminum) substrates that can be fabricated into formed articles, such as two-piece drawn food cans, three-piece food cans, food can ends, drawn and ironed cans, beverage can ends, and the like.

A wash coating is commercially described as the coating of the exterior of two-piece drawn and ironed ("D&I") cans with a thin layer of protectant coating. The exterior of these D&I cans are "wash-coated" by passing pre-formed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife". Once the desired amount of coating is applied to the exterior of each can, each can is passed through a thermal, ultraviolet, and/or electromagnetic curing oven to harden (e.g., dry and cure) the coating. The residence time of the coated can within the confines of the curing oven is typically from 1 minute to 5 minutes. The curing temperature within this oven will typically range from 150° C. to 220° C.

A sheet coating is described as the coating of separate pieces of a variety of materials (e.g., steel or aluminum) that have been pre-cut into square or rectangular "sheets". Typical dimensions of these sheets are approximately one square meter. Once coated, the coating is hardened (e.g., dried and cured) and the coated sheets are collected and prepared for subsequent fabrication. Sheet coatings provide coated metal (e.g., steel or aluminum) substrates that can be successfully fabricated into formed articles, such as two-piece drawn food cans, three-piece food cans, food can ends, drawn and ironed cans, beverage can ends (including, e.g., riveted beverage can ends having a rivet for attaching a pull tab thereto), and the like.

A side seam coating is described as the application of a powder coating or the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of coating, which protects the exposed "weld" from subsequent corrosion or other effects to the contained foodstuff. The coatings that function in this role are termed "side seam stripes". Typical side seam stripes are spray applied and cured quickly via residual heat from the welding operation in addition to a small thermal cure in an oven.

EXAMPLES

The following examples are offered to aid in understanding of the present invention and are not to be construed as limiting the scope thereof. Unless otherwise indicated, all parts and percentages are by weight.

Example I

Polyester Prepared with Benzene Dimethanol

A 4-neck flask equipped with stirrer, thermometer, packed column with head temperature, water condenser and nitrogen net was charged with 139.6 grams of trimethylol propane, 613.1 grams of phthalic anhydride, 204.9 grams of adipic acid and 784.8 grams of 1,4-benzene dimethanol, 1.53 grams of FASCAT 9201 catalyst was added to effect condensation. The mixture was heated slowly to 160° C. (320° F.). As the distillate started to collect, the batch temperature was increased to maintain a reactor temperature of 220° C. (428° F.) and not allowing column temperature to exceed 95° C. (205° F.). Distillation was maintained to remove water continuously. Reaction was continued until a target acid number of less than 9 was obtained. The batch was cooled to room temperature and 400 grams of 2-butoxyethanol and 761 grams of Aromatic 100 solvent were added to dissolve the polyester.

Example II

Preparation of Polyester Graft Acrylic Copolymer

A 4-neck flask equipped with stirrer, thermometer and water condenser was charged with 175 grams of the polyester of Example 1 and 95 grams of 2-butoxyethanol. The mixture was heated to 120° C. A mixture of 32.5 grams of methacrylic add, 22.3 grams of ethyl acrylate and 20.2 grams of styrene monomer was charged to the flask over a period of 120 minutes. At the same time, 6.3 grams of dibenzoyl peroxide initiator dissolved in 14.5 grams of methyl ethyl ketone was charged to the flask over the 120-minute period. The reaction mixture was held for an additional 15 minutes at 120° C. followed by the addition of one gram of chaser initiator. The batch was then held an additional one hour to complete the monomer conversion. The resultant graft copolymer was cooled below 105° C. followed by the addition of 27 grams of dimethyl ethanol amine followed by 400 grams of water to disperse the graft copolymer. The dispersion was cooled to room temperature under agitation and found to be stable indicating the formation of the graft copolymer.

Whereas particular embodiments of this invention have been described above for purposes of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

The invention claimed is:

1. A coated metal container comprising a metal container having an interior surface, wherein at least a portion of the interior surface is coated with a composition comprising a polymer derived from benzene dimethanol having segments of the following structure:

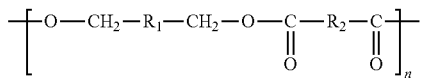

where $R_1$ is phenylene and $R_2$ is a divalent organic group and n=5 to 50, wherein the polymer is grafted to a water-dispersible (meth)acrylic acid functional monomer.

2. The coated metal container of claim 1 wherein $R_2$ comprises at least one of an arylene group containing from 6 to 12 carbon atoms or a saturated (cyclo)aliphatic group containing from 4 to 12 carbon atoms.

3. The coated metal container of claim 1 in which $R_2$ comprises linear alkylene.

4. The coated metal container of claim 1 in which the polymer has a number average molecular weight of 2,000 to 25,000 g/mol.

5. The coated metal container of claim 1 in which the composition is substantially free of bisphenol A and derivatives or residues thereof.

* * * * *